Patented Oct. 4, 1932

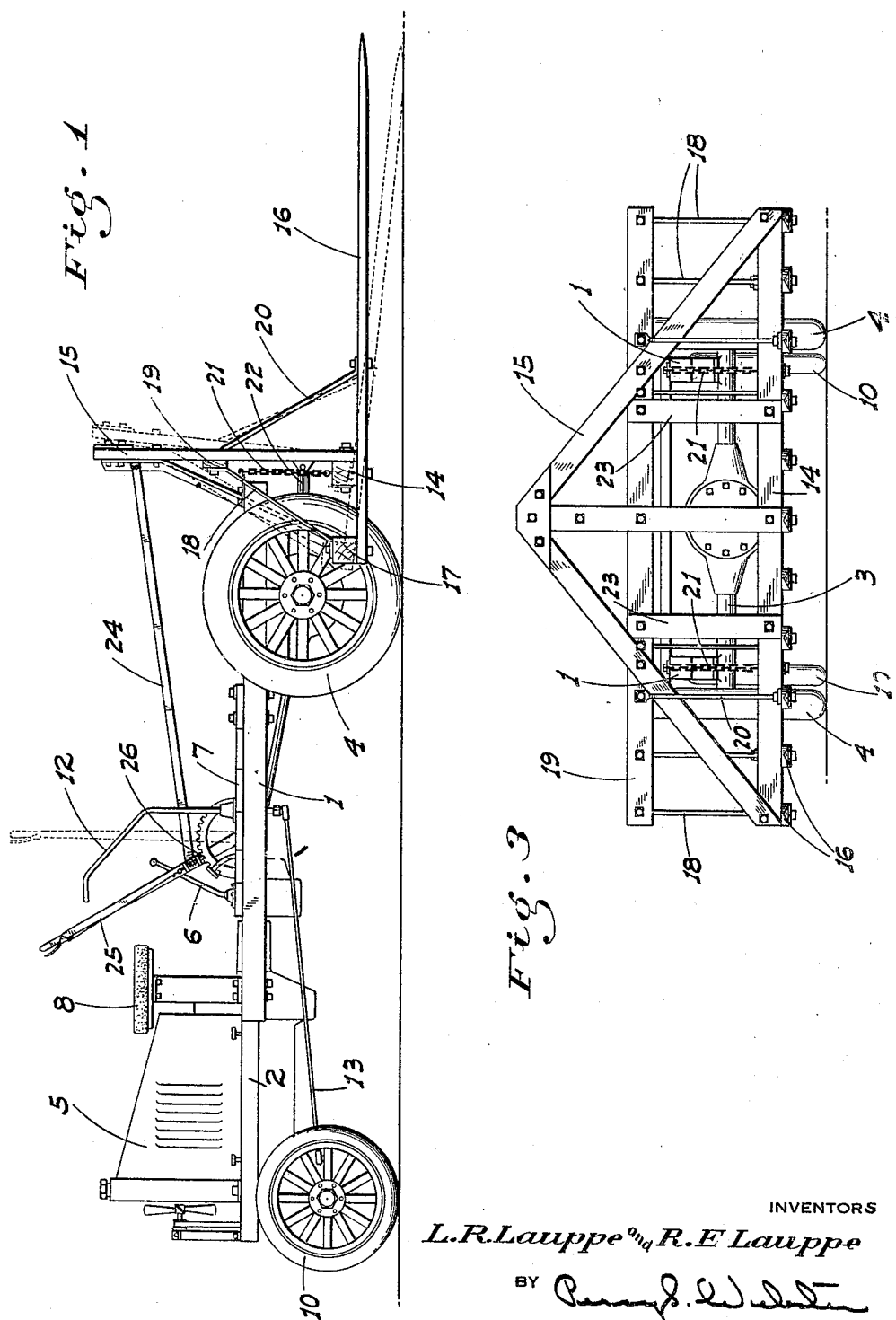

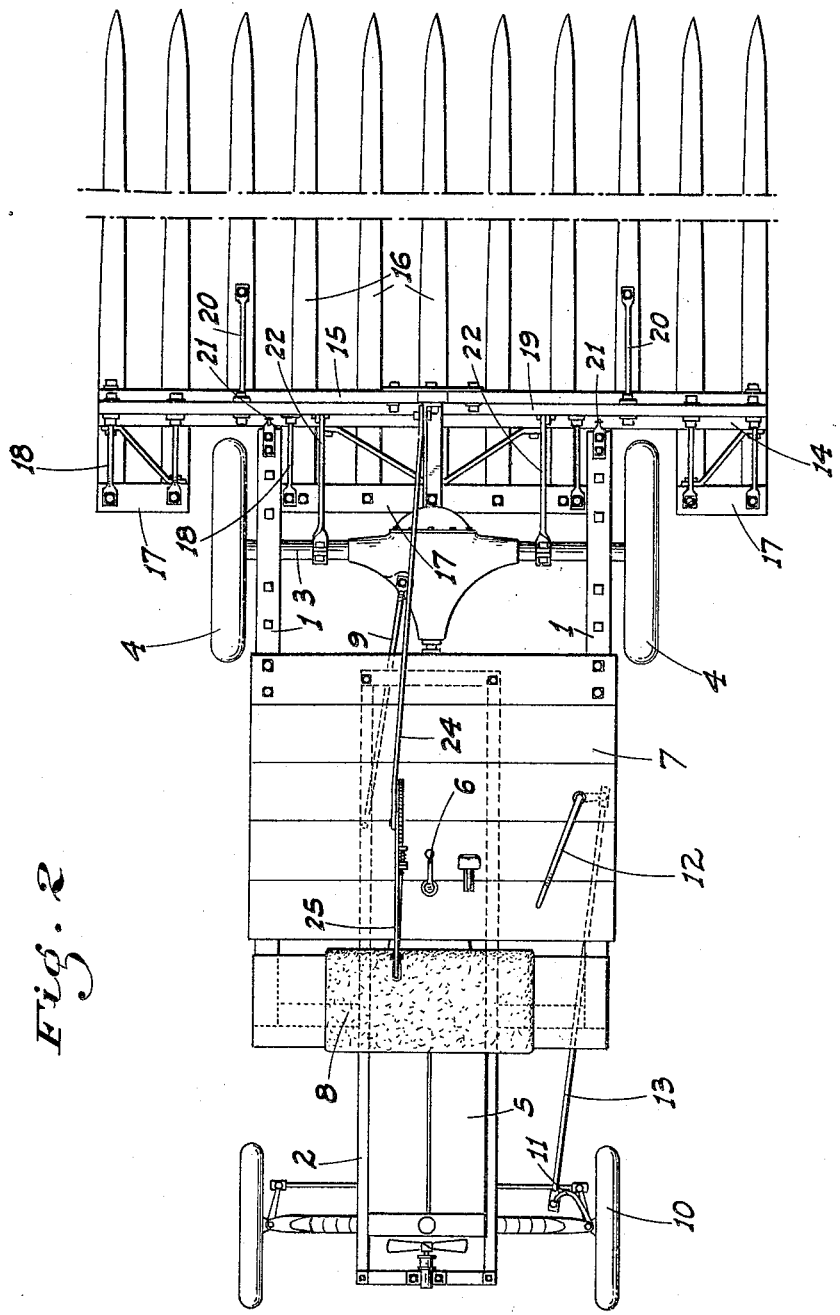

1,880,262

UNITED STATES PATENT OFFICE

LORRIS R. LAUPPE AND RAYMOND E. LAUPPE, OF SACRAMENTO, CALIFORNIA

POWER OPERATED BUCKRAKE

Application filed January 17, 1931. Serial No. 509,420.

This invention relates to buckrakes. Our principal object is to provide a buckrake and vehicle combination so arranged that the rake is both supported and driven by the vehicle, the two units being associated with each other in such a manner that the drive wheels of the vehicle are adjacent the rake, while the steering wheels of the vehicle are at the rear end of the same. By this arrangement the weight of the load on the rake gives additional traction to the driving wheels so that a relatively light vehicle may be used, while the positioning of the steering wheels relative to the rake enables the latter to turn with a circular movement rather than with a lateral dragging movement as would otherwise be the case.

The vehicle is of the motor driven wheel mounted type capable of relatively rapid movement, so that hay raking operations may be carried out much faster than is possible with the use of horses.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views:

Fig. 1 is a side elevation of our improved rake and vehicle combination.

Fig. 2 is a top plan view of the same.

Fig. 3 is a front end view of the rake.

Referring now more particularly to the characters of reference on the drawings:

As will be noted from the drawings, while the rake and vehicle in themselves are what may be considered as units of conventional or standard types, such units have been altered somewhat in construction so as to adapt them to each other.

The vehicle comprises horizontal frame beams 1, set further apart than the normal side frames 2 of the motor vehicle, and suitably secured thereto so as to be rigid with each other. The beams 1 are set on the same level as the frames 2 and extend forwardly from intermediate the ends of the latter to a point beyond the same.

Adjacent their forward ends the beams 1 are strapped on to the axle housing 3 of the drive wheels 4, which are disposed outside said beams. The wheels are driven from the engine of the vehicle which is supported on the frame 2 at their rear end and enclosed in a housing or hood 5. The engine and the connections between the same and the drive wheels are of conventional or standard character, so that it is unnecessary to definitely illustrate the same here. Said connections, however, include a gear transmission structure and a differential. The transmission has a control lever 6 which projects up through a flooring 7, mounted on the rear portion of the beams 1 and operable from a seat 8, which extends crosswise of the frame forwardly of the engine. The axle housing in which the differential mechanism is enclosed as usual is prevented from possible rotation by an arm 9, which is secured thereon to one side of the propeller shaft and extends thence rearwardly to a connection with the adjacent frame 2.

The rear end of the vehicle is supported by steerable wheels 10, which are mounted for swivel movement in a vertical transverse plane, so as to accommodate themselves to the undulations and unevenness likely to be encountered in the ground over which the structure must travel when in operation. These wheels are coupled together for simultaneous steering by the customary connections 11. Steering is effected by a steering bar 12 disposed forwardly of the seat 8 in a position convenient to the occupant, and is connected to the steering connections by a steering arm 13. The wheels 10 are closer together than the wheels 4, so that said wheels 10 will not track in the depressions likely to be made in the ground by the wheels 4, due to the load thereon.

From the foregoing description it will be seen that the vehicle as herein shown is a motor car chassis of a standard type, arranged so as to normally run backwards instead of forwards. The axle housing and differential are inverted in position so that the forward speed gearing of the transmission may be used when the vehicle is traveling in a direction opposite to the steering wheels. It is to be understood, however, that a vehicle of special design and built for this particular purpose may be employed.

The buckrake mounted in connection with the vehicle comprises a main transverse beam 14 and an A frame 15, projecting upwardly from the same. Rake teeth 16 in the form of a row, as usual, project forwardly from the underside of the beam 14, most of said teeth projecting rearwardly of the beam a certain distance and being secured at their rear ends to the separated but aligned beams 17. The beams 17 and consequently the teeth are braced against deflection relative to the A frame by diagonal braces 18 extending upwardly from the beams 17 to connections with a cross-beam 19, secured to the A frame intermediate the top and bottom of the same. The teeth which terminate at the beam 14 are braced against deflection by diagonal braces 20, extending downwardly and forwardly from the beam 19, to said teeth.

The rake is designed so that the beam 14 may be disposed close to the forward edges of the wheels 4, the latter being set in the spaces between the separated beams 17 or in line with those teeth which terminate at the beam 14. The rake is held in suspended relation from the vehicle by chains 21 or the like which depend from the forward ends of the beams 1 to the rake beam 14.

The rake is held against lengthwise movement relative to the vehicle by compression arms 22 turnably engaging the axle housing 3 and extending thence forwardly to pivotal connections with uprights 23, which are mounted in rigid connection with the A frame.

To tilt the rake teeth up or down, we apply a pull bar 24 to the A frame adjacent the top of the same, which bar extends rearwardly to a control lever 25 mounted on the platform 7 in front of the seat 8 in a position convenient to the occupant. A pawl and ratchet mechanism 26 is associated with the lever to hold the same, and consequently the rake, in any position.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. In combination, a self-propelled vehicle including side frame-beams, drive wheels adjacent the front end of the beams and an axle housing associated with the wheels below the beams; and a buckrake structure extending ahead of the vehicle and including rake teeth, a transverse beam secured across the teeth and disposed ahead of the wheels below the front end of the vehicle beams, and a frame upstanding from the transverse beam; vertical suspension elements extending between and flexibly connected to the side beams and transverse beam, horizontal compression arms turnably mounted on the axle housing and extending thence forwardly to and pivotally connected to the frame, and means applied to the buckrake structure to tilt the teeth vertically in either direction and to normally hold the same in a predetermined position.

2. A structure as in claim 1, in which said last named means comprises a manually controlled and rearwardly projecting pullbar connected at its forward end to that portion of the frame which projects above the beams.

In testimony whereof we affix our signatures.

LORRIS R. LAUPPE.
RAYMOND E. LAUPPE.